United States Patent
Bhamidipaty et al.

(10) Patent No.: US 10,241,786 B2
(45) Date of Patent: Mar. 26, 2019

(54) EVALUATING PROJECT MATURITY FROM DATA SOURCES

(71) Applicant: International Business Machines Corporation, Armonk, NY (US)

(72) Inventors: Anuradha Bhamidipaty, Yorktown Heights, NY (US); Evelyn Duesterwald, Millwood, NY (US); Andrew L. Frenkiel, Irvington, NY (US); Peter H. Westerink, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 21 days.

(21) Appl. No.: 15/415,943

(22) Filed: Jan. 26, 2017

(65) Prior Publication Data
US 2018/0210728 A1    Jul. 26, 2018

(51) Int. Cl.
*G06F 9/44*      (2018.01)
*G06F 8/77*      (2018.01)
*G06Q 10/00*     (2012.01)

(52) U.S. Cl.
CPC .............. *G06F 8/77* (2013.01); *G06Q 10/00* (2013.01)

(58) Field of Classification Search
CPC ....................................................... G06F 8/77
USPC ....................................................... 717/101
See application file for complete search history.

(56) References Cited

U.S. PATENT DOCUMENTS

| | | | | |
|---|---|---|---|---|
| 7,035,809 B2 * | 4/2006 | Miller | ................... | G06Q 10/06 705/7.23 |
| 7,139,999 B2 * | 11/2006 | Bowman-Amuah | ........ | G06Q 10/06 717/101 |
| 7,774,743 B1 * | 8/2010 | Sanchez | ................. | G06Q 10/06 717/101 |
| 7,810,067 B2 * | 10/2010 | Kaelicke | ................ | G06Q 10/10 717/102 |
| 8,296,719 B2 * | 10/2012 | Chaar | .................... | G06Q 10/00 700/95 |

(Continued)

OTHER PUBLICATIONS

2012 International Workshop on Information and Electronics Engineering (IWIEE); The Project Management Maturity Model and Application Based on PRINCE2—Zhang Lianyinga, He Jinga, Zhang Xinxinga; School of Management, China—Procedia Engineering 29—2012.*

(Continued)

*Primary Examiner* — Francisco J Aponte
(74) *Attorney, Agent, or Firm* — Cantor Colburn LLP; Rahan Uddin (57) ABSTRACT

Techniques are provided for performing automated operations to determine maturity of a specified project. Information is received regarding each of a plurality of artifacts associated with the project, such as project documentation, source code repositories, and a tracked issue database for the project. A data sufficiency level associated with each provided artifact is determined, and each artifact is provided to one or more of multiple analysis engines. The analysis engines are executed to produce one or more weighted feature vectors for each of the artifacts associated with the specified project, and input to a prediction engine in order to provide a maturity rating for the project based on the weighted feature vectors.

14 Claims, 3 Drawing Sheets

(56) References Cited

U.S. PATENT DOCUMENTS

| | | | | |
|---|---|---|---|---|
| 8,370,803 | B1* | 2/2013 | Holler | G06F 8/36 717/101 |
| 8,423,960 | B2* | 4/2013 | Farchi | G06F 11/3676 717/101 |
| 8,578,341 | B2* | 11/2013 | Bassin | G06F 8/20 717/130 |
| 8,667,469 | B2* | 3/2014 | Bernardini | G06F 8/36 717/100 |
| 8,694,969 | B2* | 4/2014 | Bernardini | G06F 11/366 717/101 |
| 8,739,047 | B1* | 5/2014 | Holler | G06F 3/04842 715/221 |
| 9,015,665 | B2* | 4/2015 | Kannan | G06F 8/36 717/123 |
| 9,182,966 | B2* | 11/2015 | Avery | G06F 8/61 |
| 9,189,757 | B2* | 11/2015 | Finlayson | G06Q 10/06 |
| 9,213,543 | B2* | 12/2015 | Jain | G06F 8/76 |
| 9,483,261 | B2* | 11/2016 | Frenkiel | G06F 8/30 |
| 9,690,461 | B2* | 6/2017 | Holler | G06F 3/04842 |
| 9,858,069 | B2* | 1/2018 | Holler | G06F 8/70 |
| 2004/0073886 | A1* | 4/2004 | Irani | G06F 8/20 717/101 |
| 2004/0093584 | A1* | 5/2004 | Le | G06F 9/50 717/103 |
| 2005/0114829 | A1* | 5/2005 | Robin | G06Q 10/06 717/101 |
| 2005/0172269 | A1* | 8/2005 | Johnson | G06Q 10/00 717/124 |
| 2006/0123389 | A1* | 6/2006 | Kolawa | G06F 11/3616 717/101 |
| 2006/0235732 | A1* | 10/2006 | Miller | G06Q 10/06 705/7.23 |
| 2008/0034347 | A1* | 2/2008 | V | G06F 8/70 717/101 |
| 2008/0046859 | A1* | 2/2008 | Velarde | G06Q 10/06 717/101 |
| 2008/0092108 | A1* | 4/2008 | Corral | G06Q 10/06 717/101 |
| 2008/0178145 | A1* | 7/2008 | Lindley | G06Q 10/00 717/102 |
| 2008/0201612 | A1* | 8/2008 | Bassin | G06F 11/3616 714/38.13 |
| 2009/0064322 | A1* | 3/2009 | Finlayson | G06F 21/6218 726/21 |
| 2009/0125875 | A1* | 5/2009 | Schmitter | G06F 8/20 717/101 |
| 2009/0271760 | A1* | 10/2009 | Ellinger | G06F 8/20 717/101 |
| 2010/0017252 | A1* | 1/2010 | Chaar | G06Q 10/06 705/7.12 |
| 2010/0017783 | A1* | 1/2010 | Brininstool | G06F 8/20 717/101 |
| 2010/0023920 | A1* | 1/2010 | Chaar | G06F 8/10 717/102 |
| 2010/0031090 | A1* | 2/2010 | Bernardini | G06F 11/3612 714/38.14 |
| 2010/0031234 | A1* | 2/2010 | Chaar | G06F 8/20 717/113 |
| 2010/0275263 | A1* | 10/2010 | Bennett | G06F 21/577 726/25 |
| 2011/0296371 | A1* | 12/2011 | Marella | G06F 11/3688 717/101 |
| 2013/0074038 | A1 | 3/2013 | Fox et al. | |
| 2013/0185693 | A1* | 7/2013 | Chaar | G06Q 10/06 717/102 |
| 2014/0019196 | A1 | 1/2014 | Wiggins et al. | |
| 2014/0033166 | A1* | 1/2014 | Bassin | G06F 8/20 717/101 |
| 2014/0222485 | A1* | 8/2014 | Cantor | G06Q 10/0633 705/7.22 |
| 2014/0222497 | A1* | 8/2014 | Cantor | G06Q 10/0633 705/7.28 |
| 2014/0236654 | A1* | 8/2014 | Cantor | G06Q 10/0633 705/7.15 |
| 2014/0236660 | A1* | 8/2014 | Cantor | G06Q 10/0633 705/7.23 |
| 2014/0344775 | A1* | 11/2014 | Dunne | G06Q 10/06 717/101 |
| 2015/0121332 | A1* | 4/2015 | Bhattacharyya | G06F 8/77 717/101 |
| 2016/0307134 | A1* | 10/2016 | Cantor | G06Q 10/0633 |
| 2017/0300843 | A1* | 10/2017 | Dube | G06Q 10/06313 |

OTHER PUBLICATIONS

SonarQube, "Documentation—SonarQube Documentation—SonarQube", Created by Anonymous, last modified by Ann Campbell on Oct 13, 2016, http://docs.sonarqube.org/display/Sonar/Documentation, Accessed Online: Oct. 27, 2016, 2 pages.

* cited by examiner

EVALUATING PROJECT MATURITY FROM DATA SOURCES

BACKGROUND

The present invention relates to evaluating project maturity, and more specifically to evaluating the maturity level of a project from data sources.

The maturity level of a project such as a network-accessible service or software library may be described as the extent to which it is usable by parties other than the developer of that project without errors or complications. Typically, identifying one or more existing projects that are available for a particular task may be simpler than determining whether a particular one of those existing projects is mature (and therefore reliable), or to determine which of multiple projects has a greater maturity level.

SUMMARY

According to one or more embodiments, a method implemented by one or more computing systems configured to evaluate maturity of a project comprises receiving information regarding a plurality of artifacts associated with a project. The method further comprises, for each of at least some of the plurality of artifacts, determining a data sufficiency level associated with the artifact, identifying one or more of multiple analysis engines with which to analyze the artifact, and generating one or more weighted feature vectors for the artifact based at least in part on analyzing the artifact by the identified one or more analysis engines. The method further comprises providing, based at least in part on the weighted feature vectors, a predicted maturity rating of the project.

Other embodiments of the present invention include a computer program product and system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

In order to evaluate a current maturity level of a project, various artifacts associated with the project (e.g., project documentation, one or more source code repositories associated with the project, an issue tracking system associated with the project) can be evaluated. Such evaluation provides insight as to how active the project is, how competent the project team is, what the project development plan (or "roadmap") is, and how reliable the project may be as a third-party asset.

As used herein, the term "project" refers to any executable facility available for use by a party or entity other than that which created the executable facility, such as a network-accessible service or software library. The term "artifact," also as used herein, may refer to any content or portion of content associated with a project. Non-exclusive examples of such artifacts include project documentation, source code repositories associated with a project, issue tracking systems associated with a project, user and/or developer forums associated with a project, or similar content. Artifacts associated with a project may be structured (e.g., a number of defects and commits, reports, team, work assignments, and other similar artifacts) or unstructured (descriptions associated with defects and work assignment, feedback, documentation, and similar artifacts).

Techniques described herein may be utilized in order to automatically evaluate a maturity level of a project by determining a project maturity rating based at least in part on information captured in various artifacts (structured and unstructured) associated with the project. Higher maturity ratings are typically associated with those projects which are frequently updated and are associated with active developers and developer artifacts such as issue tracking systems.

In various embodiments of techniques described herein, a project maturity assessment (PMA) system takes as input various artifacts about a project and maps these artifacts as input to a multitude of distinct analysis engines. Additional information on the project is collected by sourcing data from various portals (which may include, as non-limiting examples: web search, enterprise search, discussion forums, etc.).

In at least some embodiments, each of the multiple analysis engines may perform an assessment of the project with respect to a particular feature set, and output a weighted feature vector which reflects an extent to which that particular feature set is present in the project. Each weighted feature vector is provided as input to a prediction engine of the PMA system in order to output a prediction of project maturity, which in one or more embodiments includes with a confidence score regarding the predicted project maturity. In certain embodiments, the PMA system may include a classification engine to determine, for each of at least some of the multiple analysis engines, those artifacts to be used as input. The classification engine may utilize one or more combinations of a machine learning process and rule engine. The PMA system may continuously modify the classification engine based on input or feedback (human assessment) about a project over time.

Figure 1:
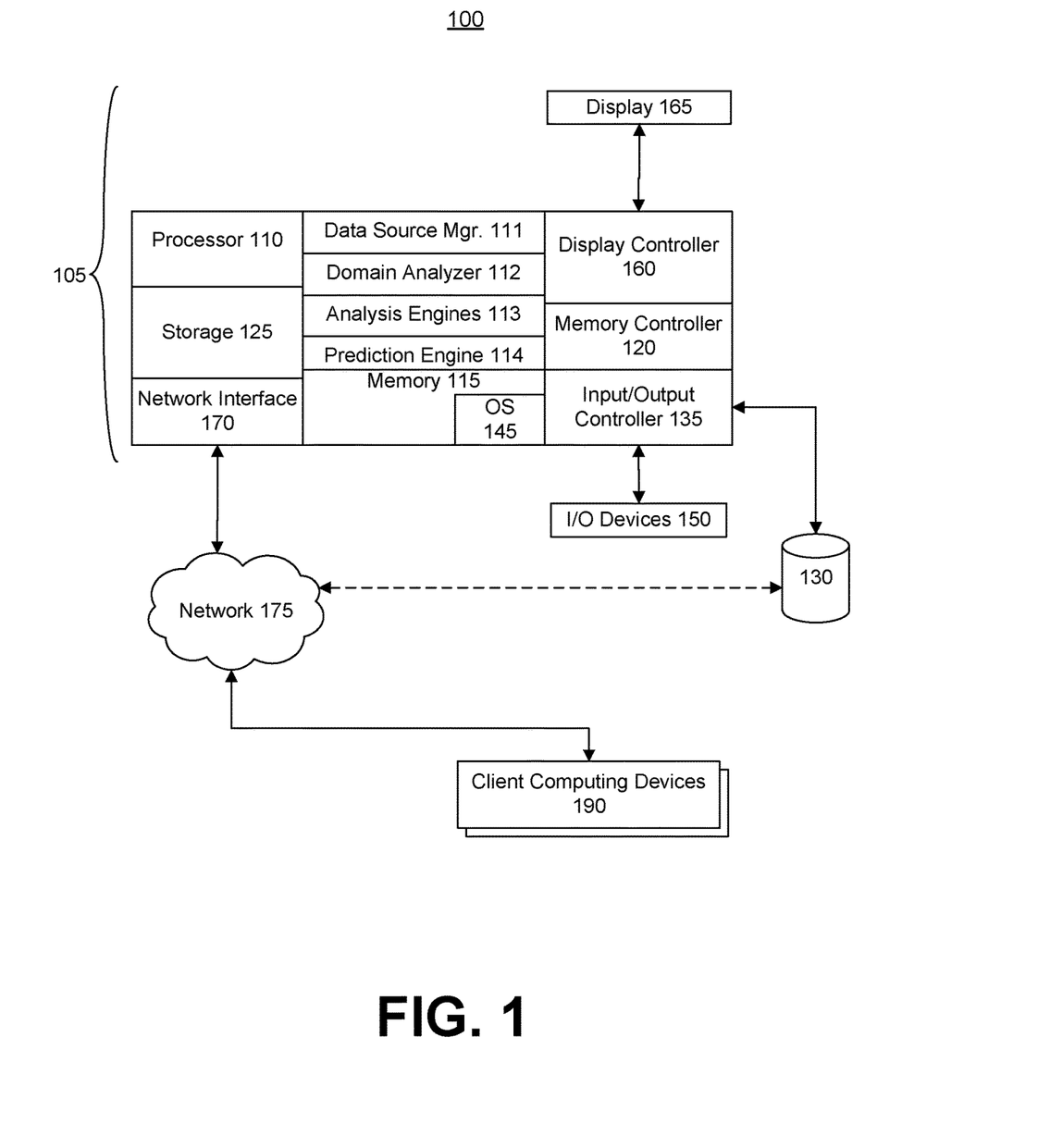
FIG. 1 depicts a block diagram of an exemplary network environment and computing system in accordance with an embodiment of the present invention.

FIG. 1 illustrates a block diagram of a networked computing system 100 suitable for use as an embodiment of a PMA system in accordance with the present invention. The methods described herein can be performed or otherwise implemented via hardware, software (e.g., firmware), or a combination thereof. In an exemplary embodiment, methods described herein can be implemented (at least in part) part by a microprocessor of a special or general-purpose digital computer, such as a personal computer, workstation, minicomputer, or mainframe computer. As depicted computing system 100 includes computer 105.

In the illustrated embodiment of FIG. 1, the computer 105 includes a processor 110, a data source manager 111, a project domain analyzer 112, analysis engines 113, a prediction engine 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. Data source manager 111 is configured to receive one or more artifacts as input elements. The operation of data source manager 111, project domain analyzer 112, analysis engines 113, and prediction engine 114 are described in further detail below with respect to FIG. 2. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the processor 110 is a hardware device for executing instructions stored in memory 115. The processor 110 can be any custom made or commercially available processor, a central processing unit (CPU), one of several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. In the depicted embodiment, one or more client computing devices 190 are communicatively coupled to the network 175, such as client computing devices associated with users who provide indications of particular artifacts associated with a specified project in order to receive from the PMA system a project maturity rating for the specified project.

The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions. In some embodiments, data source manager 111, project domain analyzer 112, analysis engines 113, and prediction engine 114 can be embodied as software instructions and stored in memory 115.

Figure 2:
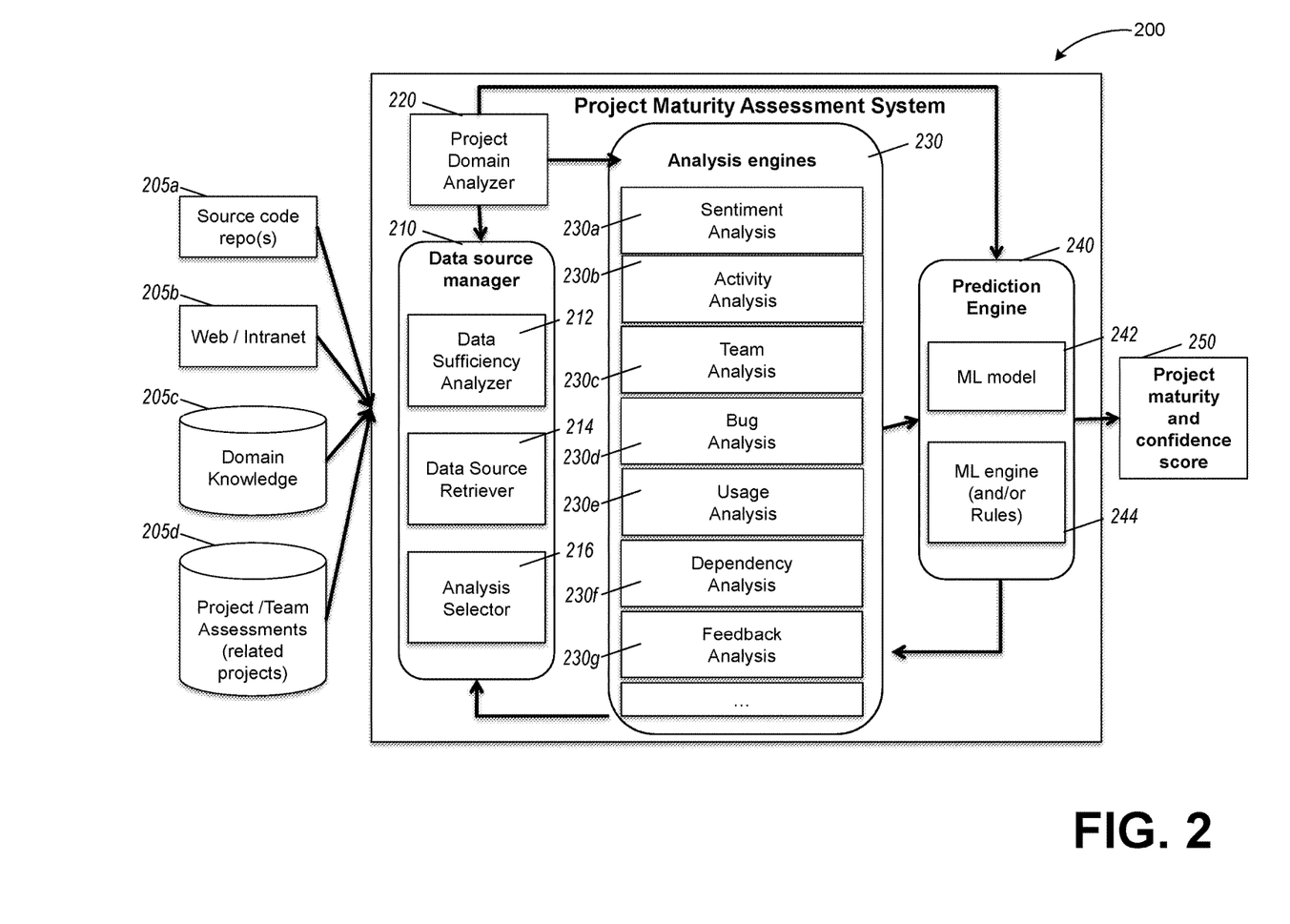
FIG. 2 depicts an exemplary architectural diagram of a project maturity assessment system in accordance with an embodiment of the present invention.

FIG. 2 depicts an exemplary architectural diagram of a PMA system 200 in accordance with an embodiment of the present invention. In the depicted embodiment, the PMA system includes a data source manager 210, a project domain analyzer 220, analysis engines 230, and a prediction engine 240. In some embodiments, data source manager 210, project domain analyzer 220, analysis engines 230, and prediction engine 240 correspond to data source manager 111, project domain analyzer 112, analysis engines 113, and prediction engine 114, illustrated in FIG. 1, respectively. In addition, FIG. 2 illustrates a variety of input artifacts 205a-205d associated with a project, as well as an output that includes a project maturity score and confidence score.

The data source manager 210 is responsible for managing information regarding various artifacts or input elements that may be used by the PMA system to predict a project's maturity. In particular, the data source manager receives information indicative of project artifacts that are associated with a specified project. In the depicted embodiment, the project artifacts include source code repository artifacts 205a, web (or intranet) artifacts 205b, domain knowledge artifacts 205c, and project/team assessment artifacts 205d (such as assessments of one or more other projects related to the particular project to be assessed by the PMA system). In the depicted embodiment, the data source manager 210 includes a data sufficiency analyzer 212, a data source retriever 214, and an analysis selector 216.

The data sufficiency analyzer 212 determines if the artifacts that are provided to the PMA system are sufficient to predict the associated project's maturity. During the training phase, the data sufficiency analyzer learns (based on rules or using machine learning) particular data sufficiency criteria; in general, the higher the maturity of a project, the more information may be necessary to understand various aspects associated with a project. In addition, in at least some embodiments the data sufficiency analyzer may provide one or more indications of any gaps that may be present in the artifacts associated with a specified project. For example, if for the specified project there is no input regarding feedback from a user community, such deficiency may be highlighted by the data sufficiency analyzer 212 as a gap.

The data source retriever 214 augments the input of project artifacts 205a-205d with additional information that may be retrieved by the PMA system from various internal and external portals. For example, team member reputation or user feedback regarding a specified project may be retrieved from external forum portals such as collaborative forums for programmers (e.g., www.stackoverflow.com), discussion forum, or other portals.

The analysis selector 216 is responsible for mapping project artifacts 205a-205d as inputs to one or more appropriate analysis engines, which are described in greater detail elsewhere herein. For example, artifacts that describe team composition and/or team member reputation may be mapped to a team analysis engine, such as team analysis engine 230c in the depicted embodiment.

Analysis engines 230 are, in at least some embodiments, 'pluggable' components in the PMA system, meaning that particular analysis engines may be added/removed from the system depending on the specified project to be assessed. In certain embodiments, at least some of the analysis engines 230 may be trained to detect a relative degree to which a particular feature set is present in the specified project and output a weighted feature vector. For example, a sentiment analysis engine (such as sentiment analysis engine 230a) takes as input a description of the issues reported in an issue tracking system associated with the specified project, and may output an indication as to whether there is positive or negative sentiment associated with the project. In one or more embodiments, each of the analysis engines 230 may additionally provide a confidence score regarding one or more feature vectors of its output.

In the depicted embodiment, analysis engines 230 include sentiment analysis engine 230a; activity analysis engine 230b; team analysis engine 230c; bug analysis engine 230d; usage analysis engine 230e; dependency analysis engine 230f; and feedback analysis engine 230g. A brief description of each of these analysis engines with respect to at least the depicted embodiment is provided below.

Sentiment analysis engine 230a utilizes natural-language processing to analyze the text associated with various artifacts and sources in order to evaluate one or more positive or negative sentiments regarding those artifacts and sources.

Activity analysis engine 230b typically computes summary metrics regarding a level of project activity, such as may be manifested by a number of issues opened/closed, a number of code commits (i.e., set of related changes), a number of files changed; a number of project forks (i.e., copies of a source code repository) associated with the project; etc.

Team analysis engine 230c generates one or more metrics characterizing an evolution of a team associated with a project, such as may be evidenced by the number of new team members in relation to a number of departed team members; experience levels and relevant expertise of a team; and the extent to which team members are "shared" by other teams and/or other projects.

Bug analysis engine 230d produces metrics that inform whether changes to the associated project is considered to have stabilized over time. Such metrics may include a number of new features opened or closed; a degree to which bugs associated with the project have increased or decreased; a level of timeliness with which features associated with the project have been implemented; a level of timeliness with which bugs associated with the project have been fixed; etc.

Usage analysis engine 230e produces metrics characterizing a degree to which a project is being utilized. Such metrics may include a number of forks associated with the project; a number of installations of the project; a number of deployments of the project; a number of transactions or API calls associated with the project; etc.

Dependency analysis engine 230f determines other projects depending upon the current project to be analyzed. The maturity levels of dependent projects would "propagate up" and inform the maturity level of the current project.

Feedback analysis engine 230g generates metrics characterizing user feedback regarding the current project, as manifested in bug reports, forum posts, etc. For example, feedback for a mature project would be relatively stable, and would contain relatively few bug reports and/or complaints regarding missing or unstable functions of the project.

In the depicted embodiment, the prediction engine 240 includes a machine learning model 242 and a machine learning rules engine 244. The prediction engine typically includes a training phase and a testing phase. During a training phase, the prediction engine receives already assessed data (i.e., projects previously assigned an assessed maturity rating) to provide a machine learning model 242. During the testing phase, an unlabeled project is classified according to the machine learning model to output the project's maturity assessment rating, along with (in at least some embodiments) a confidence score regarding that maturity assessment rating. As the prediction engine 240 receives additional information over time, the engine may continuously improve the model regarding particular features that may be more relevant for predicting the maturity of the project. One example of a machine learning model is neural network (or deep learning). In the depicted embodiment, the prediction engine 240 further includes a machine learning engine 244 that is based on rules, such as rules provided by one or more users associated the PMA system or developed by the machine learning model 242 based on historical input.

In one or more embodiments, the PMA system may consider additional domain knowledge that is relevant to the end user. The depicted embodiment further includes project domain analyzer 220, which is responsible for analyzing information about intellectual property and usage licenses, project source code, developer and project reputation, project type (e.g., a library as opposed to a service), lifecycle information, developer processes, etc.

As an example, if a software library developed by an organization reflects the core strategy of that organization, then the maturity of the project may receive a higher maturity assessment rating by the project domain analyzer 220 and, in turn, the PMA system. As another example, if an organization working on financial services publishes a software library related to financial technology services, the project domain analyzer 220 may use the reputation of the organization in an area to weight its feature vector(s) output to the prediction engine accordingly. Similarly, if a software project is developed using an obscure programming language that is hard to maintain and difficult to get developer resources, the maturity of the project may receive a lower maturity assessment rating and/or confidence level. As yet another example, if the PMA system is tasked with determining a maturity rating for a project specified by an organization which is working on mainframe computing systems, then software projects which are written in COBOL may receive a higher maturity rating, such as if the organization is known to possess the knowledge/expertise to maintain projects written in that particular programming language.

The following discussion describes activities of an embodiment of a PMA system in accordance with techniques described herein and an internal catalog containing approximately 800 projects from IBM Research. Such projects typically follow a maturity lifecycle consisting of stages described as Basic, Alpha, Beta and Commercial. The PMA system (and components thereof, such as prediction engine 240 in the embodiment depicted in FIG. 2) are typically trained using manually labeled asset maturity ratings from the internal catalog.

Typical projects from the internal catalog include "The catalog API" project. In order to evaluate a maturity rating for a project, a variety of URLs may be provided to the PMA system, with each provided URL corresponding to a particular artifact associated with the "The catalog API" project. A non-exclusive list of such artifacts may, for example, include a project summary and description; project issues (via an issue tracking system available at the corresponding provided URL); project feedback and associated comments (via a project forum available at the corresponding provided URL); and project source code. Specific URLs associated with such artifacts are input to the PMA system in order for the PMA system to evaluate a project maturity rating for the project.

A data sufficiency analysis is performed by data sufficiency analyzer 212, which indicates that dependency information regarding the project is missing. For purposes of this example, the data sufficiency engine may be configured using rules that check for the presence of data feeds for each of the analysis engines. In another embodiment, the data sufficiency analysis engine is also a trained machine learning model.

The data source retriever 214 then gathers dependency information about the asset using one or more domain policies. As one non-limiting example, a domain policy may specify to query one or more domain-specific software tools for such dependency information. Typically, a higher maturity rating of a specified project may be associated with a greater number of additional projects utilizing that specified project.

The analysis selector 216 maps each of the above artifacts into one or more of the multiple analysis engines 230. For example, asset feedback/issues/comments may be mapped as input to the activity analysis engine 230b and bug analysis engine 230d. For purposes of this example, the bug analysis engine 230d outputs a feature vector with features such as a quantity of open (unsolved or unaddressed) errors, a mean time to resolve such errors, a quantity of such errors classified as or otherwise deemed critical, and a general user sentiment associated with resolved errors. Each of the analysis engines 230 outputs such a feature vector, which is in turn input to the prediction engine 240 to provide a project maturity assessment rating.

In this example, the project maturity assessment rating is provided (along with a confidence score regarding that assessment rating) to a user for validation. In addition, human feedback may, in certain embodiments, be utilized to continuously improve the learning components of the PMA system.

Figure 3:
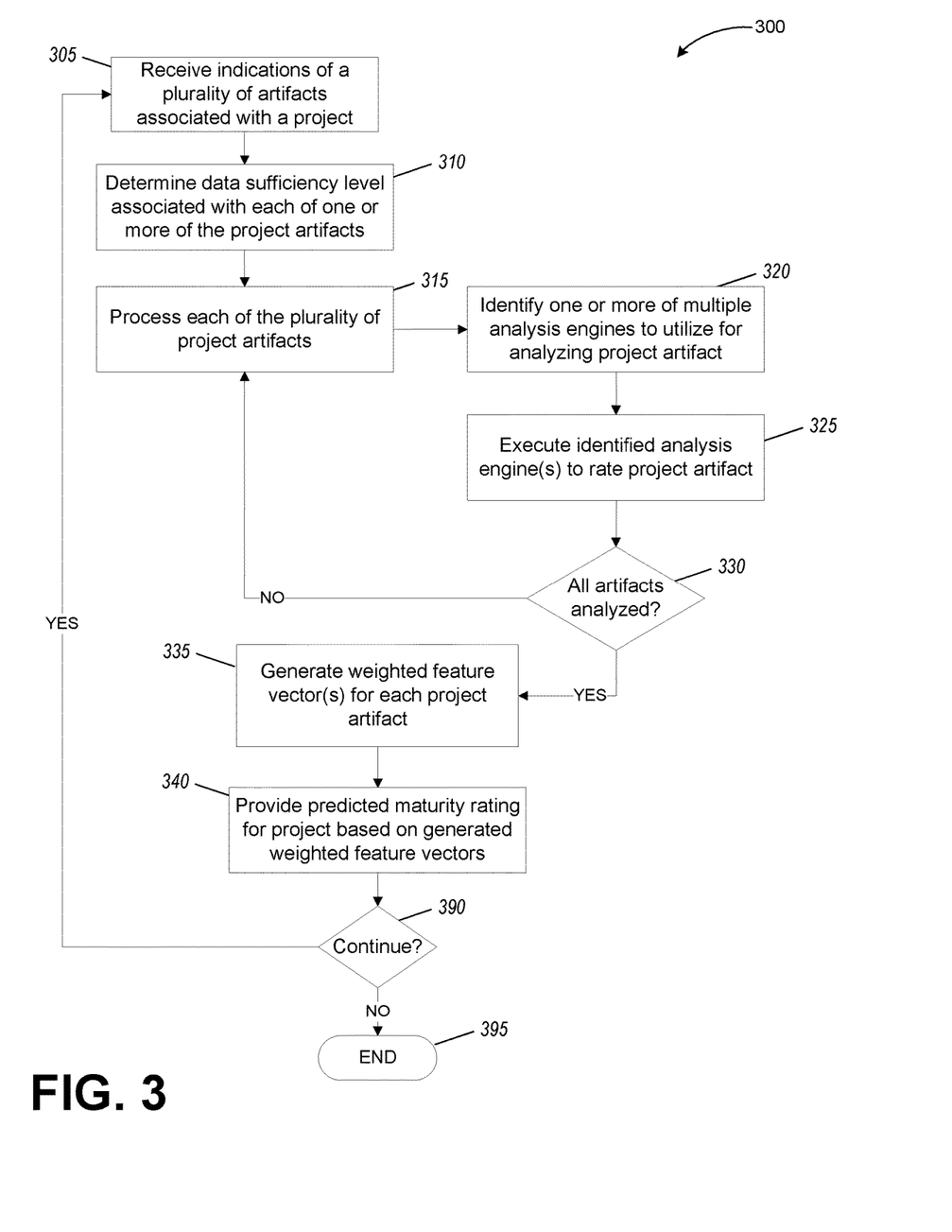
FIG. 3 depicts a process flow for a project maturity assessment system in accordance with an embodiment of the present invention.

FIG. 3 depicts a process flow 300 for a PMA system in accordance with an embodiment of techniques described herein. The routine begins at block 305, in which the PMA system receives indications of a plurality of artifacts associated with an indicated project, such as if one or more users provide a uniform resource locator (URL) associated with one or more of the associated project artifacts. At block 310, the PMA system begins processing each of at least some of the plurality of artifacts associated with the indicated project.

In the depicted embodiment, processing each artifact includes determining at block 315 (such as via Data Sufficiency Analyzer 312 of FIG. 3) a data sufficiency level associated with each of one or more of the project artifacts. Processing continues at block 320 by identifying one or more of multiple analysis engines to utilize for analyzing the project artifact, and executing (at block 325) the identified analysis engines to generate a feature vector and/or other appropriate rating for the project artifact. As described in greater detail elsewhere herein, non-limiting examples of such analysis engines include the analysis engines 230 of FIG. 2.

At block 330, the routine determines whether all of the project artifacts associated with the indicated project have been analyzed using the analysis engines identified for each of those artifacts. If not, the routine returns to block 315 in order to begin processing the next project artifact.

Once the PMA system has analyzed all of the artifacts associated with the indicated project, the routine proceeds to block 335, in which the PMA system generates one or more weighted feature vectors for each of those project artifacts. At block 340, the PMA system provides a maturity rating for the indicated project based at least in part on the weighted feature vectors generated in block 335.

In block 390, the PMA system determines whether it is to continue, such as in response to receiving an explicit indication to terminate. If it determines to continue, the PMA system routine returns to block 305 to await further indications of additional projects and/or artifacts associated with those projects. Otherwise, the PMA system may end operations of the depicted and/or other routines as appropriate, as shown at block 395.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for evaluating maturity of a project, the method comprising:
   receiving, by one or more computing systems, information regarding a plurality of artifacts associated with a project, the project comprising a network-accessible service or a software library;
   identifying one or more data gaps associated with an artifact of the plurality of artifacts the identifying based at least in part on data sufficiency criteria learned using machine learning;
   based at least in part on the identifying one or more data gaps, retrieving additional information regarding the artifact of the plurality of artifacts from one or more data portals external to the one or more computing systems;
   performing automatically for each of at least some of the plurality of artifacts:
      determining, by the one or more computing systems, a data sufficiency level associated with the artifact;
      identifying, by the one or more computing systems, one or more of multiple analysis engines with which to analyze the artifact; and
      generating, based at least in part on analyzing the artifact by the identified one or more analysis engines, one or more weighted feature vectors for the artifact and a confidence score regarding the one or more weighted feature vectors; and
   providing, automatically by the one or more computing systems and based at least in part on the one or more weighted feature vectors generated for the at least some artifacts, a maturity rating for the project, wherein the maturity rating is utilized by a third party other than a developer working on the project to determine whether the project is usable by the third party.

2. The computer-implemented method of claim 1 wherein the plurality of artifacts are selected from a group that consists of documentation associated with the project, source code repository associated with the project, and an issue tracking system associated with the project.

3. The computer-implemented method of claim 1 wherein the multiple analysis engines are selected from a group that consists of a sentiment analysis engine, an activity analysis engine, a team analysis engine, a bug analysis engine, a usage analysis engine, a dependency analysis engine, and a feedback analysis engine.

4. The computer-implemented method of claim 1, wherein providing the maturity rating of the project includes providing a confidence score regarding the maturity rating.

5. The computer-implemented method of claim 1, wherein said receiving information regarding the plurality of artifacts includes, for at least one artifact, receiving a Uniform Resource Locator (URL) associated with the at least one artifact.

6. A computer program product for evaluating maturity of a project, the computer program product comprising a non-transitory computer readable storage medium having program instructions embodied therewith, the program instructions executable by a computing system to cause the computing system to perform a method comprising:
   receiving, by a processor, information regarding a plurality of artifacts associated with a project, the project comprising a network-accessible service or a software library;
   identifying, by the processor, one or more data gaps associated with an artifact of the plurality of artifacts, the identifying based at least in part on data sufficiency criteria learned using machine learning;
   based at least in part on the identifying one or more data gaps, retrieving, by the processor, additional information regarding the artifact of the plurality of artifacts from one or more data portals external to the one or more computing systems;
   performing automatically, by the processor, for each of at least some of the plurality of artifacts:
   determining a data sufficiency level associated with the artifact;
   identifying one or more of multiple analysis engines with which to analyze the artifact; and
   generating based at least in part on analyzing the artifact by the identified one or more analysis engines, one or more weighted feature vectors for the artifact and a confidence score regarding the one or more weighted feature vectors; and
   providing, automatically by the processor and based at least in part on the one or more weighted feature vectors generated for the at least some artifacts, a maturity rating for the project, wherein the maturity rating is utilized by a third party other than a developer working on the project to determine whether the project is usable by the third party.

7. The computer program product of claim 6, wherein the plurality of artifacts are selected from a group that consists of documentation associated with the project, source code repository associated with the project, and an issue tracking system associated with the project.

8. The computer program product of claim 6, wherein the multiple analysis engines are selected from a group that consists of a sentiment analysis engine, an activity analysis engine, a team analysis engine, a bug analysis engine, a usage analysis engine, a dependency analysis engine, and a feedback analysis engine.

9. The computer program product of claim 6, wherein providing the maturity rating of the project includes providing a confidence score regarding the maturity rating.

10. The computer program product of claim 6, wherein said receiving information regarding the plurality of artifacts includes, for at least one artifact, receiving a Uniform Resource Locator (URL) associated with the at least one artifact.

11. A computing system for evaluating maturity of a project, comprising:
   one or more processors; and
   at least one memory, the memory communicatively coupled to the one or more processors and including instructions that, upon execution by at least one of the one or more processors, cause the system to:
   receive information regarding a plurality of artifacts associated with a project, the project comprising a network-accessible service or a software library;
   identify one or more data gaps associated with an artifact of the plurality of artifacts, the identifying based at least in part on data sufficiency criteria learned using machine learning;
   based at least in part on the identifying one or more data gaps, retrieve additional information regarding the artifact of the plurality of artifacts from one or more data portals external to the one or more computing systems;
   perform automatically for each of at least some of the plurality of artifacts:

determine a data sufficiency level associated with the artifact;

identify one or more of multiple analysis engines with which to analyze the artifact; and generate, based at least in part on analyzing the artifact by the identified one or more analysis engines, one or more weighted feature vectors for the artifact and a confidence score regarding the one or more weighted feature vectors; and provide, automatically based at least in part on the one or more weighted feature vectors generated for the at least some artifacts, a maturity rating for the project, wherein the maturity rating is utilized by a third party other than a developer working on the project to determine whether the project is usable by the third party.

12. The system of claim 11, wherein the plurality of artifacts are selected from a group that consists of documentation associated with the project, source code repository associated with the project, and an issue tracking system associated with the project.

13. The system of claim 11 wherein the multiple analysis engines are selected from a group that consists of a sentiment analysis engine, an activity analysis engine, a team analysis engine, a bug analysis engine, a usage analysis engine, a dependency analysis engine, and a feedback analysis engine.

14. The system of claim 11, wherein providing the maturity rating of the project includes providing a confidence score regarding the maturity rating.

* * * * *